(12) United States Patent
Harvey et al.

(10) Patent No.: US 6,227,718 B1
(45) Date of Patent: May 8, 2001

(54) CONNECTOR SLEEVE ASSEMBLY AND PANEL FOR OPTICAL DISTRIBUTION FRAMES

(75) Inventors: John David Harvey, Trophy Club; Danny McGranahan, Fort Worth; Craig Strause, Bedford, all of TX (US)

(73) Assignee: Siecor Operations, LLC, Hickory, NC (US)

( * ) Notice: Subject to any disclaimer, the term of this patent is extended or adjusted under 35 U.S.C. 154(b) by 0 days.

(21) Appl. No.: 09/166,831

(22) Filed: Oct. 5, 1998

(51) Int. Cl.[7] .................................................. G02B 6/36
(52) U.S. Cl. ................................. 385/55; 385/53
(58) Field of Search .................... 385/53, 55, 56, 385/58, 59, 76, 77, 134, 135

(56) References Cited

U.S. PATENT DOCUMENTS

| | | | |
|---|---|---|---|
| 5,052,775 | * 10/1991 | Bassard et al. | 385/76 |
| 5,402,515 | 3/1995 | Vidacovich et al. | 385/135 |
| 5,511,144 | * 4/1996 | Hawkins et al. | 385/135 |

* cited by examiner

Primary Examiner—John D. Lee
Assistant Examiner—Sarah Song

(57) ABSTRACT

A connector sleeve assembly for an optical distribution frame has a connector sleeve that is capable of being angled relative to the splice tray on which it is installed to allow for easier access to one or both of the fiber optic connectors inserted into the sleeve. A panel also has a connector sleeve mounted in the plane of the panel, but capable of being angled out of the plane for easy access to the connectors inserted in the connector sleeve.

12 Claims, 5 Drawing Sheets

CONNECTOR SLEEVE ASSEMBLY AND PANEL FOR OPTICAL DISTRIBUTION FRAMES

BACKGROUND

The present invention is directed to connector sleeve assemblies or adapters and panels used in optical fiber distribution frames. Typically, the distribution frame acts as an interface between the central office switching equipment and the cable network of subscriber lines, with the sleeve assemblies and panels acting to hold mated optical fiber connectors in the distribution frames. The optical fiber connectors need to be accessible for a variety of reasons, including cleaning and reconfiguration, but the arrangement also needs to be limited in size to allow for a maximum density of connectors in the distribution frames. Prior connector sleeves allowed access to the connectors by pulling the connector sleeves upward, causing the entire connector sleeve and the optical fibers on both sides of the connection to be lifted (see, e.g., U.S. Pat. No. 5,511,144). Other features would be beneficial: a connector sleeve that allows only one side of the connector to be lifted, allows for easy access to the connectors and sleeves, increases the density of the connectors and connector sleeves on the panel in the distribution frame, and maintains the connector sleeve in the raised position. Thus, there is a need for a panel and connector sleeve that achieves these benefits.

SUMMARY OF THE INVENTION

Among the objects of the present invention is to provide a panel and connector sleeve assembly that allows easier access to optical fiber connectors in a distribution panel at a higher density and without disturbing neighboring optical fiber connectors.

Other objects and advantages of the present invention will become apparent from the following detailed description when viewed in conjunction with the accompanying drawings, which set forth certain embodiments of the invention. The objects and advantages of the invention will be realized and attained by means of the elements and combinations particularly pointed out in the appended claims.

To achieve the objects and in accordance with the purposes of the invention as embodied and broadly described herein, the invention comprises a connector sleeve assembly mountable in an optical fiber distribution panel having a bracket and a connector sleeve disposed in the bracket, the connector sleeve comprising a front end for receiving a first optical fiber connector, a back end for receiving a second optical fiber connector, an extension element adjacent each of the front end and the back end to engage a corresponding track in the bracket, and a spring member disposed between the bracket and the connector sleeve exerting a force on the connector sleeve.

To achieve the objects and in accordance with the purposes of the invention as embodied and broadly described herein, the invention also comprises a connector sleeve having a front end for receiving a first optical fiber connector, a back end for receiving a second optical fiber connector, and an extension element adjacent each of the front end and the back end, at least two substantially vertical flange members extending upward from the panel, each flange member having at least one track for receiving the extension elements on the connector sleeve, and a spring member disposed between the panel and the connector sleeve exerting a force on the connector sleeve upward between the upwardly extending flange members.

To achieve the objects and in accordance with the purposes of the invention as embodied and broadly described herein, the invention also comprises a base member having a plane, and a connector sleeve mounted to the base member and parallel to the plane, the connector sleeve having a front end for receiving a first optical connector and a back end for receiving a second optical connector, and adapted to be tilted at an angle other than parallel to the base member plane.

It is to be understood that both the foregoing general description and the following detailed description are exemplary and explanatory only and are not restrictive of the invention as claimed.

The accompanying drawings, which are incorporated in and constitute a part of this specification, illustrate several embodiments of the invention and, together with the description, serve to explain the principles of the invention.

DETAILED DESCRIPTION OF THE INVENTION

Figure 1:
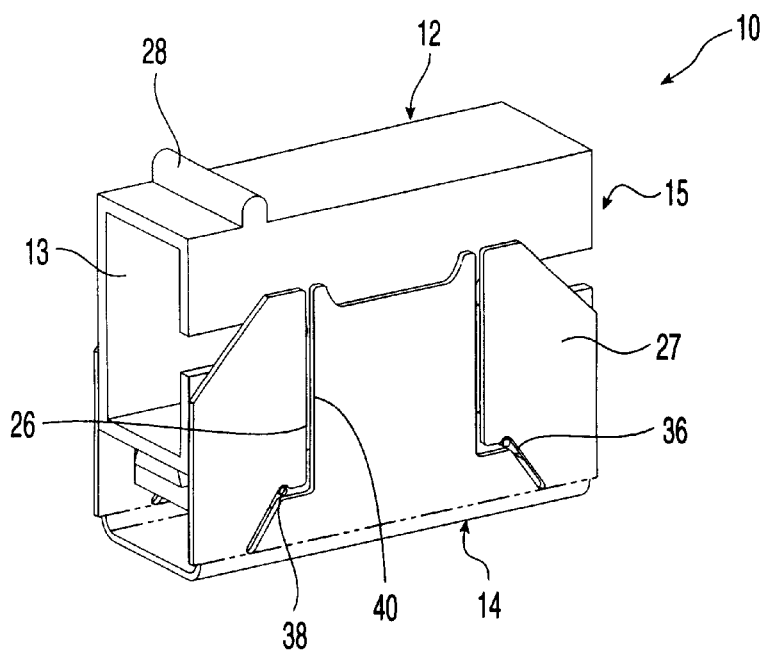
FIG. 1 is a perspective view of a single connector sleeve according to the present invention.
Figure 2:
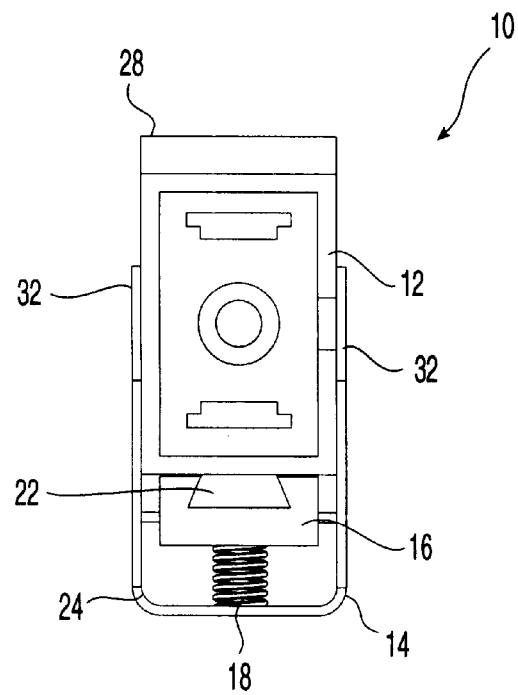
FIG. 2 is a front elevational view thereof.

Connector sleeve assembly 10, shown in FIG. 1, is comprised of a connector sleeve or adapter 12, a bracket 14, a shoe 16 attached to the bottom of connector sleeve 12, two metal pins 24 in shoe 16 (see FIG. 2) that engage the bracket 14, and a spring 18. Connector sleeve 12 as illustrated is a SC type connector sleeve for connecting two optical fibers terminated with SC connectors, which is well-known in the art, at a front end 13 and a back end 15. However, any other standard connector sleeve for a single or multi-fiber cables could also be used, although the rectangular shape of the SC connector makes it especially preferable.

Figure 3:
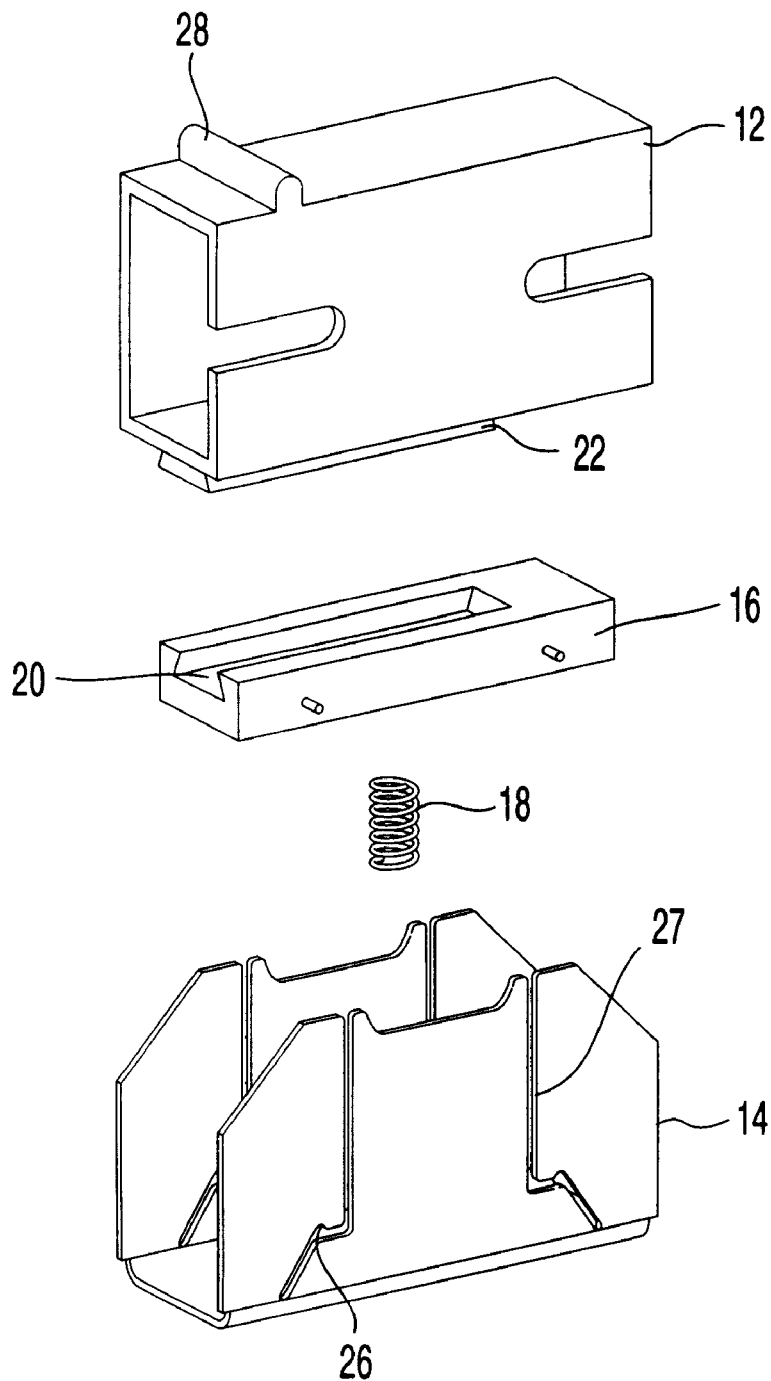
FIG. 3 is an exploded view thereof.

Attached to the bottom surface of connector sleeve 12 is a shoe 16, which is best seen in FIG. 3. The shoe 16 has a low profile to enable the assembly 10 to be as small as possible and allow a high density of connections in a distribution frame. The shoe 16 has a dove-tail slot 20, which cooperates with the dove-tail extension 22 on the bottom of the connector sleeve 12. This configuration allows the connector sleeve 12 to be removed from the shoe 16, and even from the bracket 14 and assembly 10, if so desired. However, any method of connection such as glue, fasteners, etc. could be used. The shoe 16 also has two holes into which pins 24 (FIG. 2) are inserted. Alternatively, the bottom of connector sleeve 12 could also be modified to include the holes for pins 24, or other methods of holding pins 24 (i.e., straps or pins molded into the bottom). Shoe 16 also has indentations on the bottom surface to engage spring 18 and to prevent the spring from riding up the shoe 16 when the connector sleeve is angled (as described below).

Figure 7:
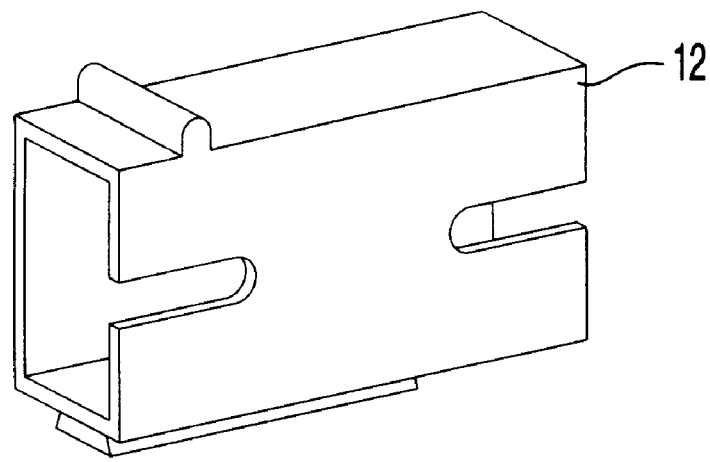
FIG. 7 is an exploded, partially fragmentary view of a connector sleeve showing an alternative embodiment.
Figure 7:
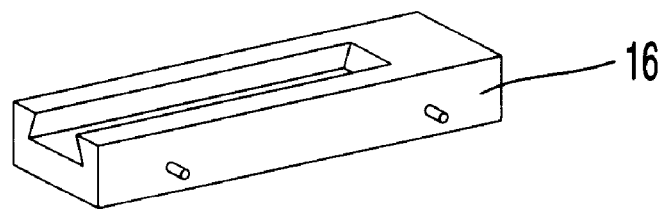
Figure 7:
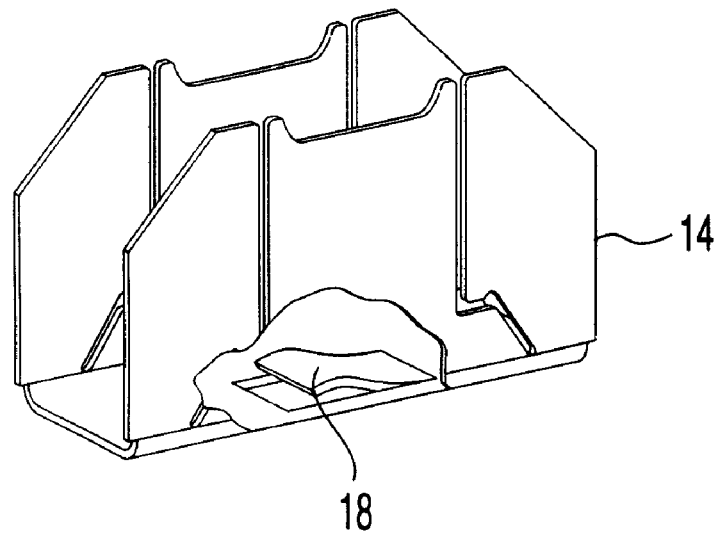

Pins 24 extend slightly beyond the edge of shoe 16 (or the connector sleeve 12) to engage a corresponding tracks or slots 26,27 in bracket 14. While true slots are depicted, slots 26,27 could also be an indentation or a recessed portion in which the pins 24 ride. The configuration of the tracks 26,27 in bracket 14 as shown in FIGS. 1–5 allow the connector sleeve 12 to be angled both backward and forward at different times, depending on the needs of the user. As best visualized with reference to FIGS. 1 and 3, the equilibrium position of the connector sleeve 12 in assembly 10 is with the pins at the top of the inverted V-shape portion of tracks 26,27 on both sides of bracket 14. This position is the equilibrium position due to two circumstances. First, the pins 24 are spaced apart from one another at a distance that corresponds to the distance between the vertices of the inverted "V"s of the tracks 26,27 (due to this distance, connector sleeve 12 is initially inserted in bracket 14 at an angle). Second, spring 18 exerts a force upward on the connector sleeve 12 to urge the pins 24 into the vertices. It should be noted that while spring 18 is depicted as a round, metal spring, any resilient element that pushes the connector sleeve upward could be used, including a tab member elevated and extending from the bracket 14. See FIG. 7. In that case, the bottom surface of shoe 16 or connector sleeve 12 could be flat, rather than being configured to ensure the spring does not shift along the bottom during activation. Moreover, while the spring 18 is fixed to the bracket 14 in the preferred embodiment, the spring 18 (or the resilient tab member) could be attached to the shoe 16, with a corresponding structure on the bracket 14 to ensure the end of the spring 18 does not travel during angling.

Figure 4:
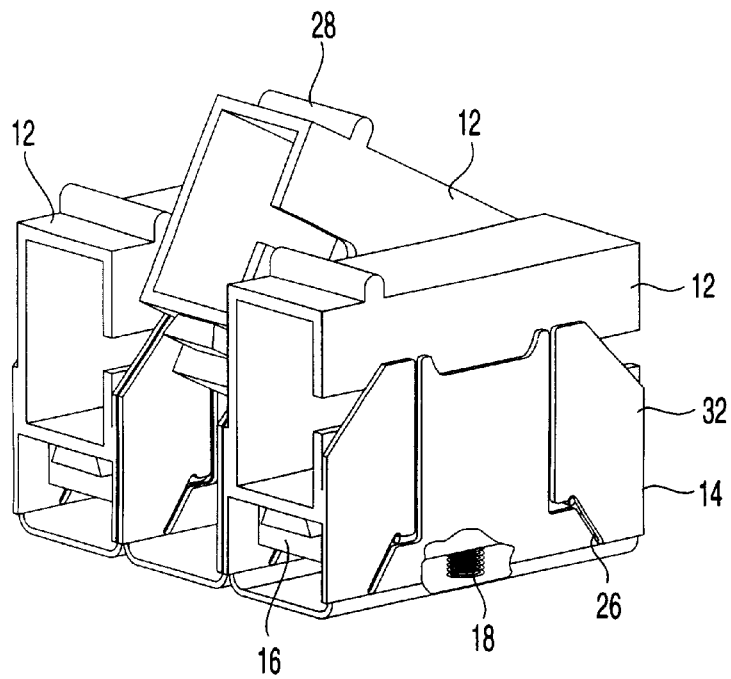
FIG. 4 is a perspective view of a row of connector sleeves according to the present invention with one of the sleeves in a tilted position.
Figure 5:
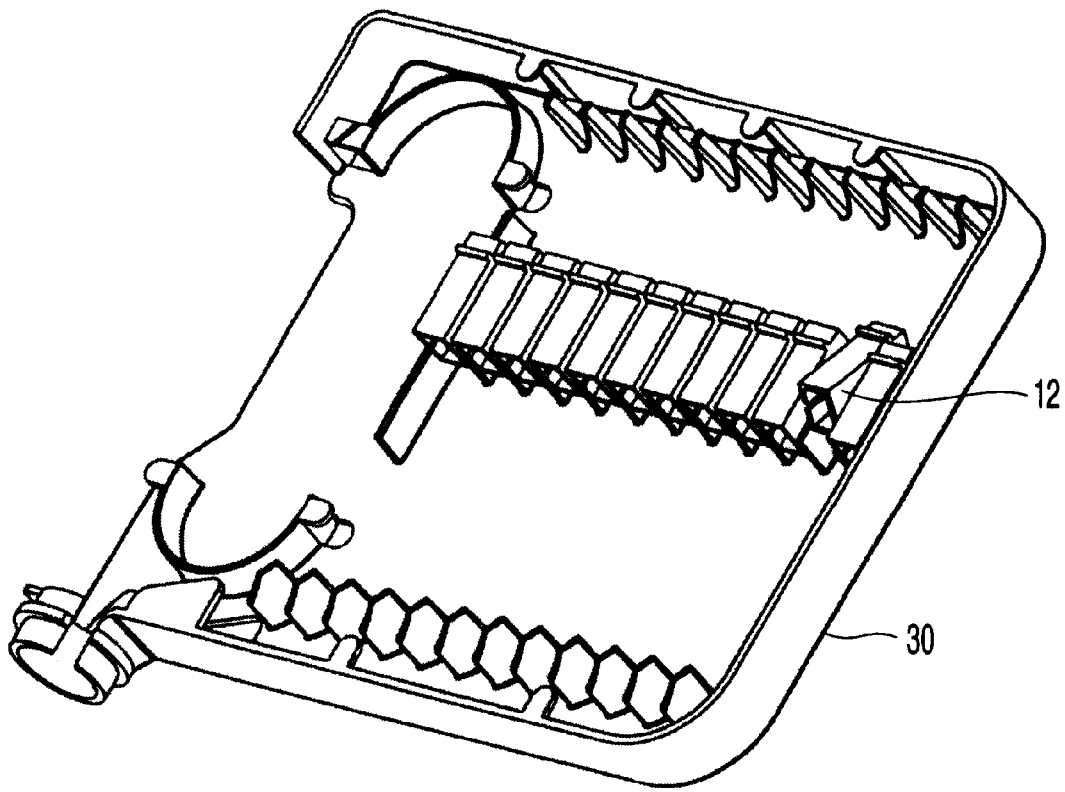
FIG. 5 is a panel for an optical distribution frame with a row of connector sleeves, one of the sleeves being in a tilted position.

In the present embodiment, connector sleeve 12 is shown with a handle or raised element 28 to assist in angling or rocking the connector sleeve 12 for access. While the handle 28 is depicted at one end, it could be placed anywhere along the top surface of connector sleeve 12, including in the middle. A user wanting to raise one end of the connector sleeve to gain access to an inserted connector (not shown), to clean under, etc., would push down and rearward. This would, referring to FIG. 1, cause the rearward pins (one on each side) to travel downward and backward in the leg portion 36 of tracks 27. At the same time since the pins are fixed relative to one another, the forward pins would also travel backward and in leg portion 38 of tracks 26. The pins 24 stop the rearward motion by contacting the surfaces of the tracks 26,27. The spring 18 then urges the connector sleeve 12 upward and the forward pins travel upward in the long portion 40 of the forward track 26. The resting position of the connector sleeve in the angled position is shown in FIGS. 4 and 5. This angled position allows a user to easily access a connector inserted into the connector sleeve, with little if any disturbance to the adjacent connector sleeves.

Once finished accessing the connector sleeve 12, the user simply pushes downward on the front portion of the connector sleeve and slightly forward to once again engage the forward pins 24 in the vertices of the inverted "V"s of the tracks 26.

To gain access to the rearward connector, the user performs the same motions on the front portion of the connector sleeve 12. That is, the user pushes down and forward on the front portion of the connector sleeve, and the spring will cause the rear of connector sleeve 12 to angle upward.

As illustrated in FIG. 5, a row of the assemblies 10 can be included on a panel, such as a tray or drawer 30, which is then mounted in a distribution frame, such as the one assigned to the same assignee and described in U.S. Pat. No. 5,511,144, the contents of which are fully incorporated here by reference. The mounting mechanism may be permanent (e.g., rivets, screws, solder, etc.) or may be removable. The panel could be any connector or splice tray, drawer, shelf, module, etc., that is used in conjunction with a distribution frame. Moreover, while the tray 30 is shown in a horizontal position, the trays could be mounted in a vertical or any other orientation relative to the distribution frame.

The bracket 14 is preferably a U-shaped metallic piece. This construction allows a minimum thickness to be used with the bracket 14, thereby allowing for a maximum number of assemblies 10 to be included on a splice tray 30. Alternatively, bracket 14 could also be made of plastic or any other suitable material, provided the material is sufficiently strong when made thinly. Alternatively, rather than a bracket 14, two side portions, corresponding to sides 32 of bracket 14, could be directly attached to the bottom of splice tray 30, or even stamped out of the bottom of the tray 30. Each side portion 32 could be further divided into two discrete elements rather than the single element corresponding to one side portion 32. That is, four individual pieces (two on each side) could be used rather than bracket 14 to eliminate weight and reduce the amount of structure between adjacent connector sleeves 12.

Figure 6:
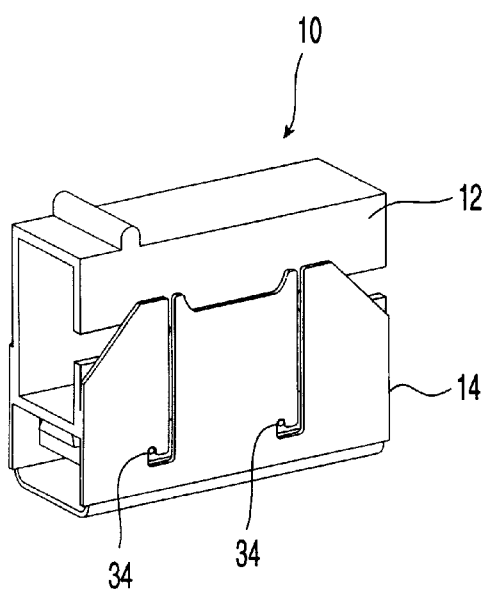
FIG. 6 is a perspective view of a second embodiment of the connector sleeve according to the present invention.

As seen in FIG. 5, the assemblies 10 (and thus the connector sleeve 12) are mounted parallel to the plane of the splice tray 30. Such a position, while reducing the height of the splice tray 30, makes it difficult for the user to get access to and fingers underneath the connectors, especially if the adjacent connector sleeves are occupied. Thus, allowing the connector sleeve 12 to be angled upward and at an angle relative to the plane of the tray 30, allows the user to more easily access a specific connector without moving adjacent connectors. Moreover, the angling of the connector sleeve in the manner done here also limits the movement of the opposing, connected fiber. If the front connector is accessed and angled upward, then the rear optical fiber and its connector do not move as much as if the connector sleeve were simply lifted upward. However, in those instances where the movement of the rearward optical fiber is not as important, another embodiment is shown in FIG. 6. In this embodiment, the tracks 26 in bracket 14 (or side portions as discussed above) are different from the first embodiment, but all other elements remain the same.

As shown in FIG. 6, the tracks 26 are J-shaped, with the equilibrium position being at the front 34 of the J. To access connectors (not shown) in the connector sleeve 12, the user pushes the connector sleeve 12 down and slightly backward to disengage the pins 24 from the front 34 of the J and to allow the spring 18 to push the connector sleeve 12 upward in the long portion of the tracks 26. In this embodiment as well as in the first embodiment (FIGS. 1–5), the connector sleeve 12 stays up or angled, respectively, once accessed, rather than having to be held as with prior art sleeves.

It will be apparent to those skilled in the art that various modifications and variations can be made in the connector sleeve assemblies and trays of the present invention and in construction of the assemblies and trays without departing from the scope or spirit of the invention.

We claim:

1. A connector sleeve assembly mountable in an optical fiber distribution panel comprising:
   a bracket mountable in the optical fiber distribution panel, the bracket having a bottom portion;
   a connector sleeve disposed in the bracket and having a front end for receiving a first optical fiber connector, a back end for receiving a second optical fiber connector, and an extension element adjacent each of the front end and the back end to engage a corresponding track in the bracket; and a spring member disposed between the bracket and the connector sleeve exerting a force on the connector sleeve away from the bottom of the bracket.

2. The connector sleeve assembly according to claim 1, wherein each extension element comprises a pin disposed on the bottom of the connector sleeve and extending beyond each side of the connector sleeve.

3. The connector sleeve assembly according to claim 1 further comprising a shoe attached to a bottom surface of the connector sleeve and carrying the extension elements.

4. The connector sleeve assembly according to claim 1, wherein the spring member is a round spring.

5. The connector sleeve assembly according to claim 1, wherein the spring member is a resilient tab member.

6. The connector sleeve assembly according to claim 1, wherein the track is an elongated, recessed portion in the bracket.

7. The connector sleeve assembly according to claim 1, wherein each track is a J-shaped slot.

8. The connector sleeve assembly according to claim 1, wherein each track is a slot having three interconnecting legs, the first leg extending substantially straight downward from a top edge of the bracket toward a bottom portion of the bracket for a predetermined distance, the second leg interconnecting with an end of the first leg near the bottom of the bracket and extending upwardly at an angle for a predetermined distance, and the third leg interconnecting with the second leg at an opposite end from the first leg and extending downwardly at an angle for a predetermined distance.

9. The connector sleeve assembly according to claim 1, wherein the connector sleeve has an elongated member on a top surface to aid in moving the connector sleeve relative to the bracket.

10. A connector sleeve mountable on a panel in an optical fiber distribution frame comprising:

a connector sleeve having a front end for receiving a first optical fiber connector, a back end for receiving a second optical fiber connector, and an extension element adjacent each the front end and the back end;

at least two substantially vertical flange members extending upward from the panel, each flange member having at least one track for receiving the extension elements on the connector sleeve; and a spring member disposed between the panel and the connector sleeve exerting a force on the connector sleeve upward between the upwardly extending flange members.

11. A panel in an optical fiber distribution frame comprising:

a base member;

a connector sleeve having a front end for receiving a first optical fiber connector, a back end for receiving a second optical fiber connector, and two extension elements spaced apart from one another;

at least two substantially vertical flange members extending upward from the base member, each flange member having at least one track for receiving the extension elements on the connector sleeve; and a spring member disposed between the base member and the connector sleeve exerting a force on the connector sleeve upward and away from the base member.

12. A panel in an optical fiber distribution frame comprising:

a base member having a plane; and a connector sleeve mounted to the base member and parallel to the plane, the connector sleeve having a front end for receiving a first optical connector and a back end for receiving a second optical connector, and adapted such that the front end and the back end can be tilted at an angle relative to the base member to allow access to the front and back ends.

* * * * *